(12) United States Patent
Knoppert et al.

(10) Patent No.: US 8,068,292 B2
(45) Date of Patent: Nov. 29, 2011

(54) ELECTRONIC DEVICE INCLUDING A STEPPED LENS

(75) Inventors: Michiel S. Knoppert, Chicago, IL (US); Gabriel G. Khouri, Vernon Hills, IL (US); Mark R. Malon, Wauconda, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 62 days.

(21) Appl. No.: 12/649,823

(22) Filed: Dec. 30, 2009

(65) Prior Publication Data

US 2011/0157728 A1 Jun. 30, 2011

(51) Int. Cl.
G02B 7/02 (2006.01)
G02B 3/00 (2006.01)
(52) U.S. Cl. .................... 359/808; 359/809; 359/819
(58) Field of Classification Search .......... 359/694–701, 359/808–824, 642; 257/72, 59; 345/173
See application file for complete search history.

(56) References Cited

U.S. PATENT DOCUMENTS

| 7,674,000 | B2 * | 3/2010 | Valerio et al. ............ 362/97.3 |
| 2008/0062715 | A1 * | 3/2008 | Park et al. .................. 362/612 |
| 2009/0066871 | A1 * | 3/2009 | Nakamura et al. ............ 349/43 |
| 2010/0309106 | A1 * | 12/2010 | Kuromizu ....................... 345/87 |
| 2011/0043470 | A1 * | 2/2011 | Ishihara et al. .............. 345/173 |

OTHER PUBLICATIONS

U.S. Appl. No. 29/319,881, filed Jun. 17, 2008, in the name of Matthew M. Seflic, entitled "Communication Device".
U.S. Appl. No. 29/319,882, filed Jun. 17, 2008, in the name of Matthew M. Seflic, entitled "Communication Device".
U.S. Appl. No. 29/329,026, filed Dec. 8, 2008, in the name of Michiel S. Knopert, entitled "Communication Device".
U.S. Appl. No. 29/329,028, filed Dec. 8, 2008, in the name of Michiel S. Knoppert, entitled "Communication Device".
U.S. Appl. No. 29/345,802, filed Oct. 22, 2009, in the name of Michiel S. Knoppert, entitled "Communication Device".

* cited by examiner

Primary Examiner — Mohammed Hasan

(57) ABSTRACT

Disclosed is an electronic device including a lens having a stepped edge and a viewing area and more particularly, an electronic device having a display in which the viewing area of the lens is stacked with the active area wiring of a display panel and the stepped edge of the lens is stacked with the connectors on the periphery of the display panel. A housing portion is stacked with the stepped edge of the lens and the connectors on the periphery of the display panel. In this way, a maker of electronic devices can make use of the space occupied by the connectors of the display panel so that the active area of the display panel may occupy more of the total area of the surface of the device.

16 Claims, 2 Drawing Sheets

ELECTRONIC DEVICE INCLUDING A STEPPED LENS

FIELD

Disclosed is an electronic device including a lens having a stepped edge and a viewing area and more particularly, an electronic device having a display in which the viewing area of the lens is stacked with the active area wiring of a display panel and the stepped edge of the lens is stacked with the connectors on the periphery of the display panel.

BACKGROUND

Electronic devices frequently include display screens. Furthermore, a display screen may be touch-sensitive including a capacitive touch panel. The active area of the touch panel has at its periphery on at least two sides, connectors configured for connection to circuitry of the electronic device. The electronics of a touch sensitive panel are in communication with the circuitry of the device. A lens and possibly other layers cover the touch sensitive panel. The lens area covers at least the active area of the touch sensitive panel. A decorative piece may be positioned within or over a housing frame to hide the touch panel's peripheral wiring.

DETAILED DESCRIPTIONS

While there is a trend toward the inclusion of more features and improvements for current features, there is also a trend toward smaller mobile communication devices. As mobile communication device technology has continued to improve, the devices have become increasingly smaller. Fewer and/or smaller hardware and software components are therefore desirable when adding new features and making improvements to the current features in the smaller devices. Fewer components may provide a cost benefit to the consumer. Particularly in small devices, it would be beneficial to maximize the touch screen active area.

Disclosed is a lens having a stepped edge and a viewing area. The viewing area of the lens is stacked with the active area wiring of the touch sensitive panel. The touch sensitive panel wiring has a periphery where it has connectors configured for connection to circuitry of the electronic device. The stepped edge, at least in part, is stacked with the panel connectors. A housing portion is stacked with the stepped edge of the lens, avoiding the need for a decorative piece to hide the connectors. In this way, the touch screen active area may occupy more of the total area of the surface of the device.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Figure 1:
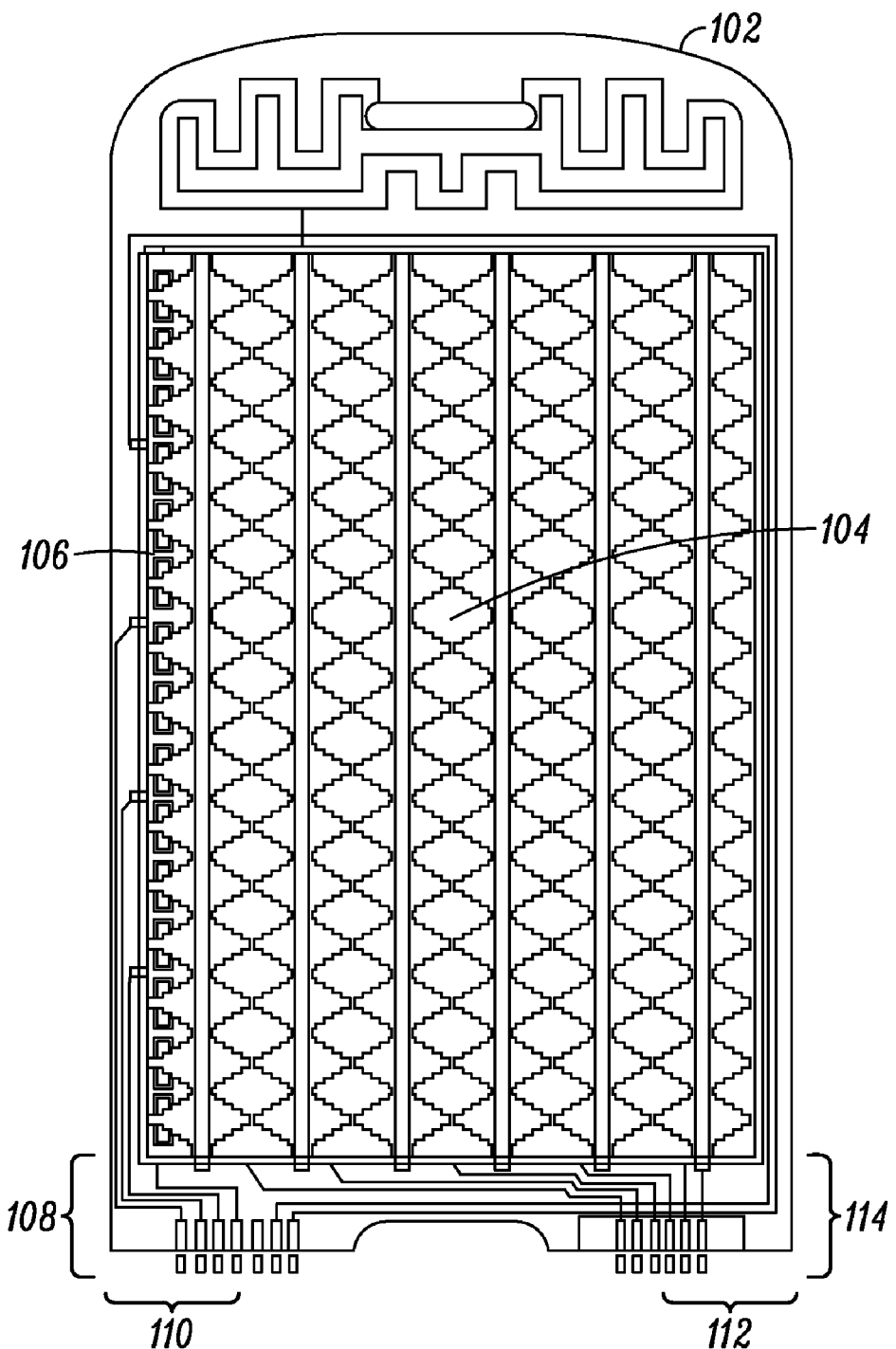
FIG. 1 depicts an embodiment of circuitry of a touch sensitive panel.

FIG. 1 depicts an embodiment of circuitry of a touch sensitive panel 102. The active area 104 of the touch sensitive panel 102 has a periphery 106 which includes connectors configured for connection to circuitry of an electronic device. Connectors 106, 108, 110 and 112 are located on at least two sides or edges of the periphery 106.

It is understood that while this discussion includes that of a touch sensitive panel and the connectors of a touch sensitive panel as that is what is illustrated in FIG. 1, that any type of display panel, including one that has only visual output, may be similarly constructed, and any and all types of display panels that include connectors on one or more edges of their periphery are included in this discussion.

Figure 2:
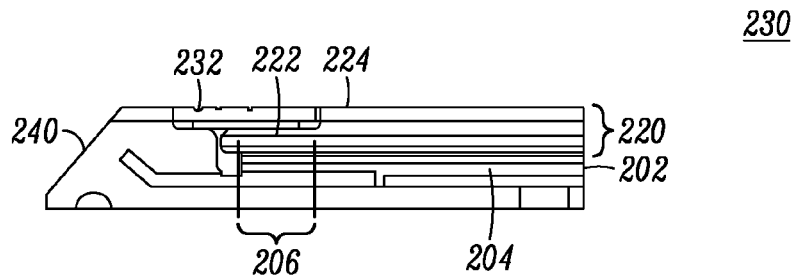
FIG. 2 depicts a side view of a lens having a stepped edge and a viewing area as it is positioned within an electronic device.

FIG. 2 depicts a side view of a lens 220 having a stepped edge 222 and a viewing area 224 as it is positioned within an electronic device 230, a portion of which is shown. The lens is glass, plastic or other suitable material. A side view of the touch sensitive panel 102 (see FIG. 1) is beneath the lens 220. The active area 204 of the touch sensitive panel 202 has a periphery 206 which includes connectors configured for connection to circuitry of an electronic device 230.

The viewing area 224 of the lens 220 is stacked with the active area 204 wiring of the touch sensitive panel 202. As discussed above, the touch sensitive panel 202 active area 204 includes a periphery where connectors 206 are configured for connection to circuitry of the electronic device 230. The stepped edge 222 of the lens 220, at least in part, is stacked with the connectors 206. The lens can include a step all around its periphery (see FIG. 3) for symmetry with the housing while the connectors may be on only two sides of the touch sensitive panel 202.

A housing portion 232 is stacked with the stepped edge 222 of the lens 220. The housing portion 232 may be a bezel of the housing 240. Accordingly, the lens 220 is extended beyond the exposed area 224, underneath the bezel 232. That is, there is a hidden portion of the lens 220, the step 222, covered by the bezel or the housing portion 232.

The bottom surface of the lens 220 can remain flat and allowing the routing of capacitive sensing wiring or traces (ITO traces). Accordingly, space for the touch sensitive panel wiring 206 beyond the visible area 224 of the lens 220 is provided. In this way the ratio between product footprint of the electronic device 230 and active area 204 of the touch sensitive panel 202 can be optimized.

Figure 3:
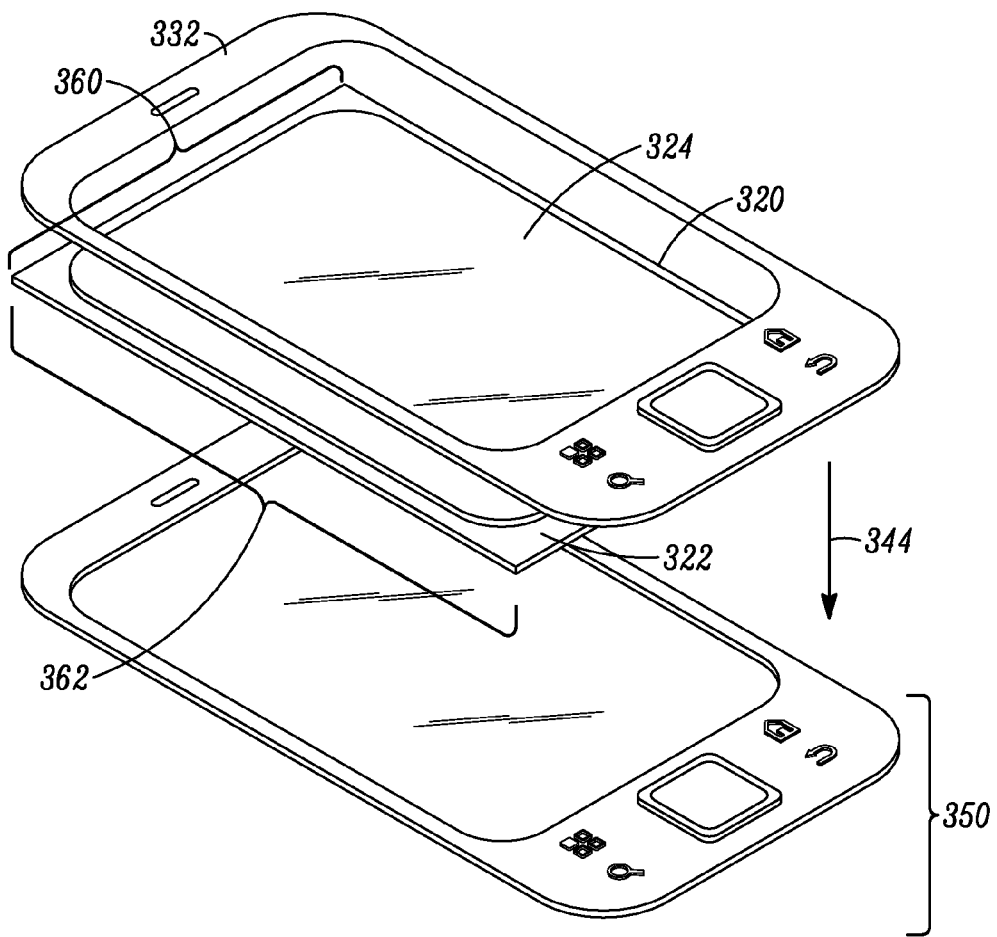
FIG. 3 is a perspective view of a design of a portion of the housing that can stacked with the stepped edge of the lens.

FIG. 3 is a perspective view of a design of a portion of the housing 332 that can stacked with the stepped edge 322 of the lens 320. In this embodiment, the stepped edge 322 is a single step.

The arrow 344 indicates that the two, the lens 320 and the housing portion 332 can be positioned together 350. It is understood that the housing portion 332 may of any suitable form and combined in any manner with any other housing portion 240 (see FIG. 2) so that they are one piece or more than one piece. The bezel or housing portion 332 and/or 240 in combination with the stepped lens 320 shown in the figures is a matter of design preference and is in no way is intended to limit the scope of the disclosed electronic device 230.

In FIG. 3 it is show that the lens 320 has a perimeter (two sides 360 and 362 of which are marked) and the lens upper perimeter includes the stepped edge 222 allowing a housing portion 332 to fit into the step 322. That is, the housing portion 332 can be fitted against the stepped edge 322. As shown where the lens 320 and the housing portion 332 are together, the viewing area 324 of the lens 320 abuts the housing portion 332. In this way a maker of electronic devices can make use of the space occupied by the connectors of the display panel without increasing the surface area dimensions of the device.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiments were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. An electronic device comprising:
    display panel wiring of a display panel having a periphery and having connectors configured for connection to circuitry of the electronic device at at least a portion of the display panel periphery;
    a lens having a stepped edge and a viewing area, the viewing area of the lens stacked with the wiring of the display panel, and wherein the stepped edge, at least in part, is stacked with the display panel connectors; and
    a housing portion stacked with the stepped edge of the lens.

2. The device of claim 1, wherein the housing portion is fitted against the stepped edge.

3. The device of claim 1, wherein the viewing area of the lens abuts the housing portion.

4. The device of claim 1, wherein the stepped edge is a single step.

5. The device of claim 1, wherein the lens has a perimeter and the lens perimeter includes the stepped edge.

6. The device of claim 1, wherein the display panel includes touch sensitive panel circuitry.

7. An electronic device comprising:
    display panel wiring of a display panel having a periphery and having connectors configured for connection to circuitry of the electronic device at at least a portion of the display panel periphery;
    a lens having a stepped edge and a viewing area, the viewing area of the lens stacked with the wiring of the display panel, and wherein the stepped edge of the lens, at least in part, is stacked with the display panel connectors; and
    a housing portion wherein the viewing area of the lens abuts the housing portion.

8. The device of claim 7, wherein the housing portion is stacked with the stepped edge.

9. The device of claim 7, wherein the stepped edge is a single step.

10. The device of claim 7, wherein the lens has a perimeter and the lens perimeter includes the stepped edge.

11. The device of claim 7, wherein the display panel includes touch sensitive panel circuitry.

12. An electronic device comprising:
    display panel wiring of a display panel having a periphery and having connectors configured for connection to circuitry of the electronic device at at least a portion of the display panel periphery;
    a lens having a stepped edge and a viewing area, the viewing area of the lens stacked with the wiring of the display panel, and wherein the stepped edge, at least in part, is stacked with the display panel connectors; and
    a housing portion wherein the housing portion is fitted against the stepped edge of the lens.

13. The device of claim 12, wherein the housing portion is stacked with the stepped edge.

14. The device of claim 12, wherein the stepped edge is a single step.

15. The device of claim 12, wherein the lens has a perimeter and the lens perimeter includes the stepped edge.

16. The device of claim 12, wherein the display panel includes touch sensitive panel circuitry.

* * * * *